United States Patent [19]
Middleton

[11] 3,890,135
[45] June 17, 1975

[54] TRIFLUOROMETHYLBENZOPHENONE O-ACYLOXIMES AND THEIR USE AS CROP YIELD INCREASERS FOR PLANTS

[75] Inventor: William Joseph Middleton, Chadds Ford, Pa.

[73] Assignee: E. I. du Pont de Nemours & Company, Wilmington, Del.

[22] Filed: Apr. 19, 1974

[21] Appl. No.: 462,396

Related U.S. Application Data

[62] Division of Ser. No. 324,878, Jan. 18, 1973, Pat. No. 3,849,494.

[52] U.S. Cl. .................................................. 71/121
[51] Int. Cl. .............................................. A01n 9/20
[58] Field of Search ........................................ 71/121

[56] References Cited
UNITED STATES PATENTS

| | | | |
|---|---|---|---|
| 3,165,392 | 1/1965 | Koopman | 71/121 |
| 3,503,732 | 3/1970 | Kahoy | 71/121 |
| 3,655,761 | 4/1972 | Gutman | 71/121 X |
| 3,771,995 | 11/1973 | Gutman et al. | 71/121 |

*Primary Examiner*—Lewis Gotts
*Assistant Examiner*—Catherine L. Mills

[57] ABSTRACT

Certain trifluoromethylbenzophenone O-acyloximes are crop yield increasers for plants. Exemplary is 4-trifluoromethylbenzophenone O-acetyloxime.

3 Claims, No Drawings

TRIFLUOROMETHYLBENZOPHENONE O-ACYLOXIMES AND THEIR USE AS CROP YIELD INCREASERS FOR PLANTS

This is a division of application Ser. No. 324,878, filed Jan. 18, 1973, now Pat. No. 3,849,494.

BACKGROUND OF THE INVENTION

1. Field of the Invention

This invention relates to trifluoromethylbenzophenone O-acyloximes and their use as crop yield increasers for plants.

2. Prior Art

The unacylated 2- and 3-trifluoromethylbenzophenone oximes are known [Lichtenberger & Weiss, Bull. Soc. Chim, France, 587 (1962); Chem. Abs. 57, 2126 (1963)]. 4-Trifluoromethylbenzophenone oxime is disclosed in words in Chem. Abs. Cumulative Index for 1962–66, AMN–BE volume, page 3193S, but this index disclosure is erroneous. It concerns the above Lichtenberger & Weiss reference, which does not mention 4-trifluoromethylbenzophenone or its oxime. 4-Trifluoromethylbenzophenone, however, is known [Rossi & Butta, Chem. Abs. 56, 12895 (1962)]. 4-Methoxy-4'-trifluoromethylbenzophenone oxime is known [Buu-Hoi et al., Rec. Trav. Chim. 85, 367 (1966)]. Benzophenone O-acetyloxime is known [Exner, Chem. Listy 48, 1634 (1954)]. The oximes per se are generally less stable than the acylated derivatives and are not known to exhibit crop yield increasing effects on plants.

SUMMARY OF THE INVENTION

The novel compounds include trifluoromethylbenzophenone O-acyloximes, including syn- and anti-isomers and mixtures thereof, of the formula

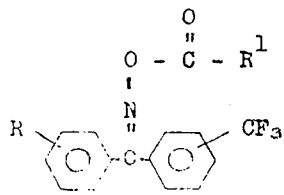

wherein R is hydrogen, methyl, trifluoromethyl or methoxy, $R^1$ is phenyl, alkyl of 1 to 11 carbons, haloalkyl of 1 to 11 carbons, phenylamino, or alkylamino of 1 to 3 carbons, and the R and $CF_3$ groups each can be in the ortho, meta or para positions. Preferred are those compounds where R = H and the $CF_3$ group is in the para position, i.e., the acyloximes of 4-trifluoromethylbenzophenone.

The oxime precursors of the compounds of formula I are obtained conventionally by reaction of the appropriate trifluoromethylbenzophenone with hydroxylamine hydrochloride in a suitable solvent and the presence of a base.

The trifluoromethylbenzophenone O-acyloximes of formula I in which R is alkyl or phenyl are obtained conventionally by reaction of the corresponding oxime with the appropriate carboxylic acid chloride or anhydride in a suitable solvent. The O-acyloximes in which R is alkylamino or phenylamino are obtained by reaction of the corresponding oxime with the appropriate alkyl isocyanate or phenyl isocyanate in a suitable ether solvent.

Representative trifluoromethylbenzophenone O-acyloximes of the invention correspond to compounds of formula I having the R and $R_1$ groups given in the following table. These compounds include the syn- and anti-isomers and mixtures thereof, and it is understood that the R and $CF_3$— groups each may be in the ortho, meta or para position.

| R | $R_1$ |
|---|---|
| Hydrogen | Methyl |
| Methyl | Propyl |
| Hydrogen | Isopropyl |
| Methoxy | Pentyl |
| Trifluoromethyl | Heptyl |
| Hydrogen | Octyl |
| Methyl | Decyl |
| Methoxy | Chloromethyl |
| Trifluoromethyl | Trifluoromethyl |
| R | $R^1$ |
| Hydrogen | 2-Bromoethyl |
| Methoxy | Chloropentyl |
| Hydrogen | Iodooctyl |
| Hydrogen | Chloroundecyl |
| Methoxy | Propylamino |
| Hydrogen | Anilino |

The trifluoromethylbenzophenone-O-acyloximes of the invention are useful as crop yield increasers for plants. For example, they enhance the production capacity of soybeans as evidenced by increased amounts of pods and seeds obtained from plants which have been treated with aqueous suspensions of such O-acyloximes.

SPECIFIC EMBODIMENTS OF THE INVENTION

The following examples illustrate the preparation and physical properties of representative novel trifluoromethylbenzophenone O-acyloximes and their use as senescence inhibitors for plants. In these examples temperatures are given in degrees centigrade except where otherwise indicated.

EXAMPLE 1

4-Trifluoromethylbenzophenone Oxime

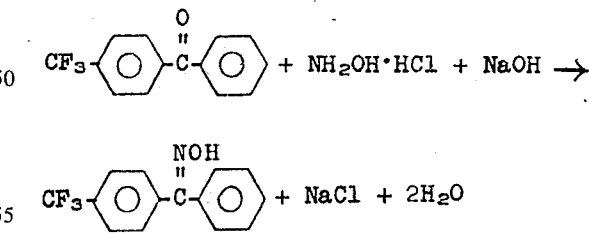

To a mixture of 50 g (0.20 mole) of 4-trifluoromethylbenzophenone, 30 g of hydroxylamine hydrochloride, 100 ml of ethanol and 45 ml of water was added, with stirring and cooling, 55 g of powdered sodium hydroxide. The mixture was refluxed 5 minutes, cooled and poured into a solution of 150 ml of concentrated hydrochloric acid in 1 liter of water. The product was filtered off, washed with water and vacuum dried over $P_2O_5$, to give 52.8 g (99.5%) of 4-trifluoromethylbenzophenone oxime as a white powdery solid: mp, 120°–155°C; $^{19}$F nmr [(CD$_3$)$_2$CO] δ −62.5 ppm (s) overlapping multiplet at 0.7 Hz higher field.

EXAMPLE 2

4-Trifluoromethylbenzophenone O-Acetyloxime

R = H; R$^1$ = CH$_3$

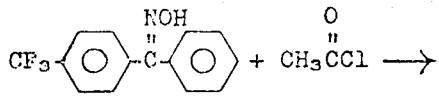

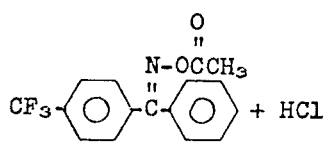

To a solution of 2.65 g (0.01 mole) of 4-trifluoromethylbenzophenone oxime in 10 ml of diethyl ether was added 1.0 g (0.013 mole) of acetyl chloride. The solution was stirred 1 hour at room temperature, then added to 20 g of ice. The ether was evaporated after the ice had melted. The solid which formed was filtered off, washed with water and dried over P$_2$O$_5$. The crude product was recrystallized from n-heptane to give 1.7 g (55%) of 4-trifluoromethylbenzophenone O-acetyloxime as white crystals: mp, 165°–170°C (with some decomposition); IR (KBr) 5.61 μ (>C=O), 6.17 μ (°C=N); $^1$H nmr (CH$_2$Cl$_2$) δ 7.47 ppm (m, 9H), δ 2.02 ppm (s, 3H), δ 1.57 ppm (impurity, 0.5 H).

Anal. Calcd for C$_{16}$H$_{12}$NO$_2$F$_3$:
 C, 62.54; H, 3.94; N, 4.56; F, 18.76 (m.W., 307.28)
Found: C, 62.15; H, 3.69; N, 4.60

In a separate experiment, 170 g (2.17 mole) of acetyl chloride was added dropwise to a solution of 450 g (1.70 mole) of 4-trifluoromethylbenzophenone oxime in 1.5 liter of ether. The mixture was stirred for 1 hour, during which time a precipitate slowly formed. This was filtered off, washed with water and small amounts of ether, and dried in vacuum over P$_2$O$_5$. The crude product was purified by washing with dilute sodium hydroxide, followed by water until the wash water was neutral, then dried over P$_2$O$_5$ under vacuum. There was obtained 460 g (88.2%) of 4-trifluoromethylbenzophenone O-acetyloxime as a white solid: mp, 168°–171°C; $^{19}$F nmr (CHCl$_3$) δ −63.3 ppm (m, J = 0.5 Hz); $^1$H nmr (CH$_2$Cl$_2$) δ 2.08 ppm (s, 3H) δ 7.6 ppm (m, 9H).

Anal. Calcd for C$_{16}$H$_{12}$NO$_2$F$_3$:
 C, 62.54; H, 3.94; N, 4.56; F, 18.76
Found: C, 62.60; H, 3.95; N, 4.73; F, 18.60.

EXAMPLE 3

4-Trifluoromethylbenzophenone O-Propionyloxime

R = H; R$^1$ = C$_2$H$_5$

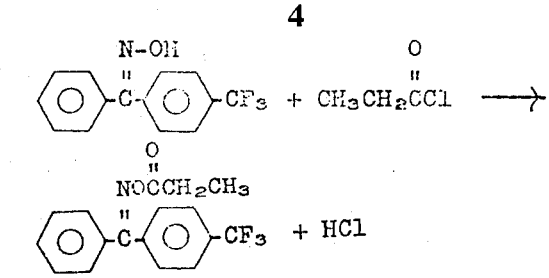

To a solution of 10 g (0.038 mole) of 4-trifluoromethylbenzophenone oxime in 45 ml of ether was added 3.5 g (0.038 mole) of propionyl chloride. The mixture was allowed to stand for 1 hour at room temperature. The ether was evaporated and the residue washed with water, dried and recrystallized from n-heptane. The product was washed with 5% aqueous NaOH and water, then dried to give 6.3 g (52%) of 4-trifluoromethylbenzophenone O-propionyloxime as an off-white solid: mp, 118°–123°C; $^1$H nmr (DMSO-d$_6$) δ 1.03 ppm (t, 3H), δ 2.42 ppm (quartet, J = 7.9 Hz, 2H), δ 7.77 ppm (m, 9H); $^{19}$F nmr (DMSO-d$_6$) δ −61.0 ppm (s).

Anal. Calcd for C$_{17}$H$_{14}$NO$_2$F$_3$:
 C, 63.55; H, 4.39; N, 4.36; F, 17.74 (m.w., 321.30)
Found: C, 63.66; H, 4.33; N, 4.59; F, 17.80.

EXAMPLE 4

4-Trifluoromethylbenzophenone O-Heptanoyloxime

R = H; R$^1$ = C$_6$H$_{13}$

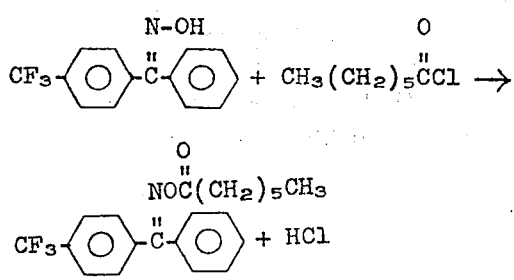

Heptanoyl chloride (5.6 g, 0.038 mole) was added dropwise to a solution of 10.0 g (0.038 mole) of 4-trifluoromethylbenzophenone oxime in 30 ml of ether. The solution was stirred overnight at room temperature. The ether was evaporated and water added. The product, which solidified slowly when chilled, was filtered off, washed with water and dried to yield 12.4 g (87%) of 4-trifluoromethylbenzophenone O-heptanoyloxime as an off-white solid: mp, 80°–84°C; $^{19}$F nmr (DMSO-d$_6$) δ −61.1 ppm (m, J = ca. 0.5 Hz); $^1$H nmr (DMSO-d$_6$), δ 7.45 ppm (m, 9H), δ 2.28 ppm (m, 2H), δ 1.25 ppm (m, 8H), δ 0.85 ppm (m, 3H); IR (KBr) 5.65 μ (>C=O).

Anal. Calcd for C$_{21}$H$_{22}$NO$_2$F$_3$:
 C, 66.83; H, 5.88; N, 3.71; F, 15.10 (m.w., 377,41)
Found: C, 66.20; H, 5.65; N, 3.58; F, 15.14.

EXAMPLE 5

4-Trifluoromethylbenzophenone O-Benzoyloxime

R = H; R¹ = C₆H₅

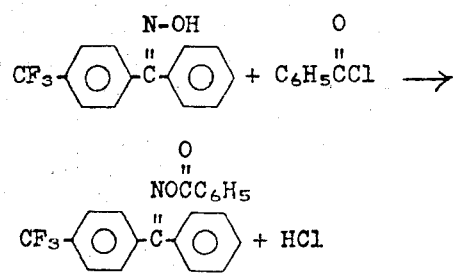

To a solution of 10 g (0.038 mole) of 4-trifluoromethylbenzophenone oxime in 25 ml of diethyl ether was added dropwise 5.4 g (0.038 mole) of benzoyl chloride. The solution was stirred overnight at room temperature. The ether was evaporated and the product washed with 5% aqueous sodium hydroxide and water and dried to yield 12.2 g (87%) of 4-trifluoromethylbenzophenone O-benzoyloxime as a white solid: mp, 114°–120°C; ¹⁹F nmr (CDCl₃) δ –63.2 ppm (s, 87%) δ –63.3 ppm (m, 13%); IR (KBr) 5.70 μ (>C=O).

Anal. Calcd for C₂₁H₁₄NO₂F₃:
    C, 68.29; H, 3.82; N, 3.79; F, 15.43 (m.w., 369.34)
Found:  C, 67.87; H, 3.48; N, 3.83; F, 15.47.

EXAMPLE 6

4-Trifluoromethylbenzophenone
O-(N-Methylcarbamoyl)oxime

R = H; R¹ = NHCH₃

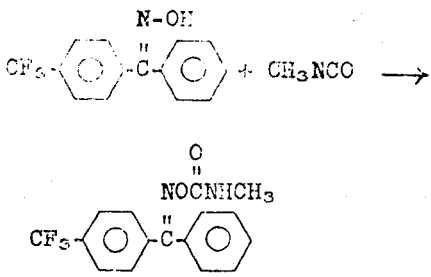

A solution of 10 g (0.038 mole) of 4-trifluoromethylbenzophenone oxime, 1.6 g (0.028 mole) of methyl isocyanate and 30 ml of diethyl ether was allowed to stand at room temperature for 48 hours under a stream of nitrogen, during which time a solid slowly formed. The ether was partially evaporated and CCl₃F was added to precipitate the product, which was filtered off and dried to give 5.0 g (55% based on methyl isocyanate) of 4-trifluoromethylbenzophenone O-(N-methylcarbamoyl)oxime as a white solid: mp, 191°–193°C; ¹H nmr [(CD₃)₂CO] δ 7.7 ppm (m, 9H), δ 7.1 ppm (broad signal, 1H), δ 2.88 ppm (d, J = 4.8 Hz, 3H), δ 2.75 ppm (minor impurity); ¹⁹F nmr [(CD₃)₂CO] δ –63.7 ppm (s).

Anal. Calcd for C₁₆H₁₃N₂O₂F₃:
    C, 59.63; H, 4.07; N, 8.69; F, 17.68 (m.w., 322.29)
Found:  C, 58.98; H, 4.09; N, 8.51; F, 17.94.

EXAMPLE 7

4-Trifluoromethylbenzophenone
O-(N-Phenylcarbamoyl)oxime

R = H; R¹ = NHC₆H₅

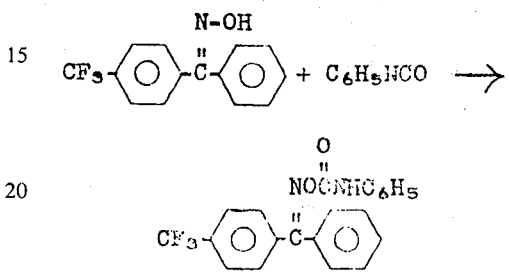

A solution of 4.5 g (0.038 mole) of phenyl isocyanate, 10 g (0.038 mole) of 4-trifluoromethylbenzophenone oxime and 25 ml of ether was stirred overnight at room temperature. After about 30 minutes the reaction mixture became a slurry of white solid and liquid. The product was filtered off, washed with a small amount of ether and water. A second fraction was obtained by filtering the filtrate. Both fractions were dried in vacuum. They were further purified by washing with 5% aqueous NaOH, water, and drying.

Fraction 1: 10 g of 4-trifluoromethylbenzophenone O-(N-phenylcarbamoyl)oxime, off-white solid, mp, 131°–143°C; ¹H nmr (DMSO-d₆) δ 9.80 ppm and δ 9.74 ppm (singlets, combined area 1H), δ 7.54 ppm (m, 14H); ¹⁹F nmr (DMSO-d₆) δ –61.1 ppm and δ –61.0 ppm (multiplets, 40:60 ratio).

Anal. Calcd for C₂₁H₁₅N₂O₂F₃:
    C, 65.62; H, 3.93; N, 7.29; F, 14.83 (m.w., 384.36)
Found:  C, 65.51; H, 3.91; N, 7.14; F, 14.92.

Fraction 2: 3.6 g of 4-trifluoromethylbenzophenone O-(N-phenylcarbamoyl)oxime, off-white solid, mp, 134°–144°C; ¹H nmr (DMSO-d₆) δ 9.83 ppm and 9.73 ppm (singlets, combined area 1H), δ 7.58 ppm (m, 14H); ¹⁹F nmr (DMSO-d₆) δ –60.9 ppm and δ –60.8 ppm (multiplets, ratio 15:85).

Anal. Calcd for C₂₁H₁₅N₂O₂F₃:
    C, 65.62; H, 3.93; N, 7.29; F, 14.83 (m.w., 384.36)
Found:  C, 65.03; H, 3.92; N, 6.80; F, 14.85.

EXAMPLE 8

2-Trifluoromethylbenzophenone O-Acetyloxime

R = H; R' = CH₃

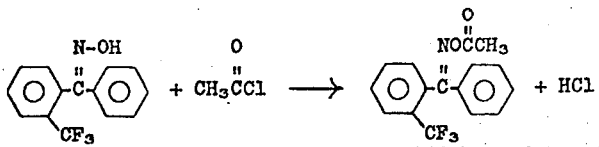
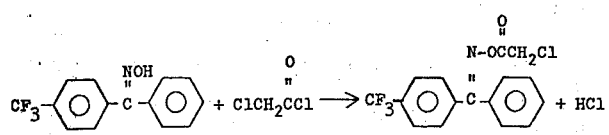

To a solution of 2.0 g (0.0076 mole) of 2-trifluoromethylbenzophenone oxime in 10 ml of ether was added dropwise an excess of acetyl chloride at room temperature. The ether was evaporated, the residue washed with water and dried. The crude product was recrystallized from n-hexane using decolorizing carbon, to give 1.24 g (53.2%) of 2-trifluoromethylbenzophenone O-acetyloxime as a white crystalline solid: mp, 74.5°–79.5°C; $^{19}F$ nmr (CDCl$_3$) δ −61.2 ppm (m); $^1H$ nmr (CDCl$_3$) δ 7.4 ppm (m, 9H), δ 1.98 ppm (s, 3H).

To 10 g (0.038 mole) of 4-trifluoromethylbenzophenone oxime in 50 ml of ether was added 4.35 g (0.038 mole) of chloroacetyl chloride. The ether solution was washed with 25 ml of cold water, dried over magnesium sulfate, and evaporated to dryness. The solid was recrystallized from carbon tetrachloride, yielding 4.74 g (35%) of 4-trifluoromethylbenzophenone O-chloroacetyloxime, mp 103°–110°C., $^1H$ nmr [(CD$_3$)$_2$CO/TMS]: δ 4.27 ppm (s, 2H), δ 7.6 ppm (m, 9H); $19_F$ nmr [(CD$_3$)$_2$CO]: δ 64.0 ppm (m).

Anal. Calcd for C$_{16}$H$_{12}$NO$_2$F$_3$:
    C, 62.54; H, 3.94; N, 4.56; F, 18.55 (m.w., 307.28)
Found:  C, 62.58; H, 3.96; N, 4.60; F, 18.83.

Anal. Calcd. for C$_{16}$H$_{11}$ClF$_3$NO$_2$:    C, 56.24; H, 3.24; N, 4.10
Found:    C, 55.93; H, 2.79; N, 4.07
    C, 55.72; H, 2.94; N, 3.79.

EXAMPLE 9

4-Methoxy-4'-trifluoromethylbenzophenone O-Acetyloxime

R = OCH$_3$; R$^1$ = CH$_3$

EXAMPLE 11

4-Trifluoromethylbenzophenone O-Trichloroacetyloxime

R = H; R$^1$ = CCl$_3$

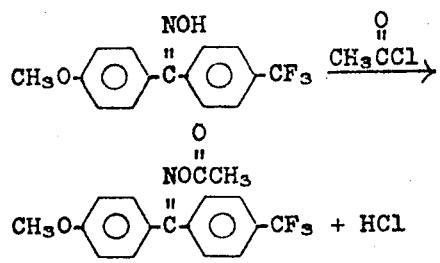

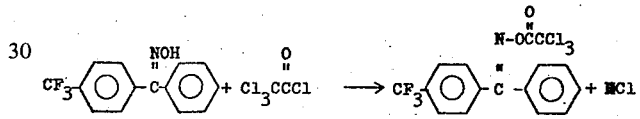

To a solution of 10 g (0.035 mole) of 4-methoxy-4'-trifluoromethylbenzophenone oxime in 50 ml of diethyl ether was added dropwise 2.7 g (9.034 mole) of acetyl chloride at 22° to 28°C. A solid slowly formed. The mixture was stirred for 1 hour and cooled. The solid was filtered off, washed with ether and water and vacuum-dried over P$_2$O$_5$. There was obtained 9.4 g (82.5%) of 4-methoxy-4'-trifluoromethylbenzophenone O-acetyloxime as a white solid: mp, 127°–140°C; $^1H$ nmr [(CD$_3$)$_2$CO] δ 7.65 ppm (m, 8H), δ 3.89 ppm (s, 3H), δ 2.04 ppm (s, 3H); $^{19}F$ nmr [(CD$_3$)$_2$CO] δ −62.2 ppm (m, 95%), δ 62.0 ppm (s, 5%).

To a solution of 5.3 g (0.02 mole) of 4-trifluoromethylbenzophenone oxime in 50 ml of ether was added 3.7 g (0.02 mole) of trichloroacetyl chloride. The solution was evaporated to dryness, yielding 6.5 g of 4-trifluoromethylbenzophenone O-trichloroacetyloxime, mp 92°–102°C., $1_H$ nmr (CDCl$_3$/TMS), δ 7.5 ppm (m).

Anal. Calcd for C$_{17}$H$_{14}$NO$_3$F$_3$:
    C, 60.54; H, 4.18; N, 4.15; F, 16.90 (m.w., 337.20)
Found:  C, 59.89; H, 4.02; N, 3.97; F, 17.15
    C, 59.66; H, 4.15; N, 4.01

Anal. Calcd for C$_{16}$H$_9$F$_3$Cl$_3$NO$_2$:    C, 46.80; H, 2.21; N, 3.41
Found:    C, 46.46; H, 2.26; N, 3.17
    3.19.

EXAMPLE 10

4-Trifluoromethylbenzophenone O-Chloroacetyloxime

R = H; R$^1$ = CH$_2$Cl

EXAMPLE A

This example illustrates the crop yield increasing effect of 4-trifluoromethylbenzophenone O-acetyloxime on soybeans when applied to the foliage.

Soybeans were grown in a mixture of equal parts of vermiculite, peat and gravel in four pots in a controlled environment growth room, each pot containing two plants. The environment was a 12-hour photoperiod with 4300 ft.c., temperature 75°F. day and 64°F. night, and a continuous relative humidity of 75%. A suspension of 4-trifluoromethylbenzophenone O-acetyloxime was applied as a foliar spray to run-off and as a soil drench treatment at the early flowering stage of development. The elapsed time from treatment to harvesting was 55 days. The treatment caused an increase in the number of pods and an increase in the number and weight of seeds per plant when compared to the untreated control. The following results were obtained:

| Treatment | Rate lb/Acre | No. of Pods/pot | No. of Seeds/pot | Dry Wt. Seeds/pot (g) |
|---|---|---|---|---|
| 4-Trifluoromethyl-benzophenone O-acetyloxime | 1/16 | 90.5 | 156.7 | 29.65 |
|  | 1/4 | 94.2 | 165.3 | 33.97 |
|  | 1/2 | 94.0 | 146.7 | 35.35 |
| Untreated control | — | 81.0 | 138.0 | 27.80 |

EXAMPLE B

This example illustrates the crop yield increasing effect of 4-trifluoromethylbenzophenone O-acetyloxime on field-grown wheat when applied to the soil.

A field of sown wheat, Blue Boy variety, was divided into identical plots of 60 square feet each. 4-Trifluoromethylbenzophenone O-acetyloxime was applied to the soil at a rate of 4 pounds per acre in four of the plots when the wheat was at the root stage of development. Four additional plots were left untreated, as controls. The plots were harvested for seed yield after about eight weeks, i.e., at maturity. The following results were obtained.

| Plots | Bushels/Acre | % of Control |
|---|---|---|
| Control | 45.1 | 100 |
| Treated | 52.9 | 117 |

The embodiments of the invention in which an exclusive property or privilege is claimed are defined as follows:

1. A method of increasing crop yield in plants comprising the step of applying to plants an effective crop yield increasing amount of 4-trifluoromethylbenzophenone O-acetyloxime.

2. A method according to claim 1 in which the plant is soybean.

3. A method according to claim 1 in which the plant is wheat.

* * * * *